United States Patent [19]

Neale

[11] Patent Number: 5,166,243

[45] Date of Patent: Nov. 24, 1992

[54] POLYORGANOSILOXANE CROSS-LINKERS FOR RTV SEALANTS

[75] Inventor: Robert S. Neale, Ossining, N.Y.

[73] Assignee: Union Carbide Chemicals & Plastics Technology Corporation, Danbury, Conn.

[21] Appl. No.: 413,095

[22] Filed: Sep. 27, 1989

Related U.S. Application Data

[63] Continuation of Ser. No. 880,307, Jun. 30, 1986, abandoned.

[51] Int. Cl.$^5$ .............................................. C08K 5/24
[52] U.S. Cl. .................... 524/266; 524/268; 524/588; 525/474; 528/33; 528/38
[58] Field of Search .................. 525/474; 528/33, 38; 524/266, 268

[56] References Cited

U.S. PATENT DOCUMENTS

| | | | |
|---|---|---|---|
| 3,350,092 | 7/1967 | Borchert | 260/46.5 |
| 3,441,583 | 1/1969 | Murphy | 260/448.2 |
| 3,451,964 | 2/1969 | Creamer | 260/37 |
| 3,519,601 | 7/1970 | Creamer | 528/38 |
| 3,535,357 | 10/1970 | Creamer | 260/448.2 |
| 3,792,073 | 5/1972 | Prokai | 260/448.8 R |
| 3,816,359 | 6/1974 | Creamer | 260/2.5 |
| 3,817,909 | 6/1974 | Toporcer et al. | 260/37 SB |
| 4,064,151 | 5/1976 | Hedaya | 260/448.2 N |
| 4,145,504 | 2/1977 | Heyays | 528/5 |
| 4,170,700 | 4/1978 | Sweet | 528/12 |
| 4,345,088 | 3/1981 | Vick et al. | 556/410 |
| 4,399,267 | 7/1982 | Bosch et al. | 528/30 |
| 4,400,526 | 9/1982 | Kanner | 556/420 |
| 4,471,132 | 5/1983 | Hallgren | 556/410 |
| 4,477,606 | 10/1984 | Fukayama | 523/200 |
| 4,485,206 | 11/1984 | Inoue | 524/719 |
| 4,496,696 | 1/1985 | Kurita | 525/479 |
| 4,496,754 | 1/1985 | Kanner | 556/420 |
| 4,503,210 | 3/1985 | Von Au et al. | 528/33 |

OTHER PUBLICATIONS

L. M. Sommer and J. D. Citron, *J. Org. Chem.* 32, 2470 (1967) "Group VIII Metal Catalyzed Reactions of Organosilicon Hydrides with Amines, Hydrogen Halides, and Hydrogen Sulfide".

*Primary Examiner*—Bernard Lipman
*Attorney, Agent, or Firm*—B. L. Deppenbrock

[57] ABSTRACT

Novel polyorganosiloxane cross-linkers for incorporation into conventional room temperature vulcanizable (RTV) sealant formulations, and the RTV sealants into which these cross-linkers are compounded, are disclosed.

15 Claims, No Drawings

POLYORGANOSILOXANE CROSS-LINKERS FOR RTV SEALANTS

This application is a continuation of prior U.S. application Ser. No. 880,307, filing data: Jun. 30, 1986, now abandoned.

BACKGROUND OF THE INVENTION

1. Field of the Invention

This invention relates to novel polyorganosiloxane cross-linders or chain extenders for room temperature vulcanizable (RTV) sealants, and to novel RTV sealant compostions containing same.

The invention further relates to novel methods of production of the claimed cross-linkers or chain extenders.

2. Description of the Prior Art

Several types of RTV sealants are described in the prior art as discussed below:

Siloxanol-silicate type

In the earliest RTV silicone system the major polymer component was a linear or moderately branched silicone with silanol terminal groups. Alkyl silicates or alkylpolysilicates, typically tetraethyl orthosilicate or partially hydrolyzed and condensed products therefrom, were used as crosslinking agents. Catalysts typically employed were tin compounds, e.g., stannous octoate, dibutyltindilaurate. Fillers, color pigments and other ancillary materials were also used. The system was usually prepared in two parts, thereby maintaining separation of the siloxanol polymer and the catalyst. At point of use, the two parts were mixed, thereby initiating crosslinking of the siloxanol. The fluid, or plastic working life, of the material is limited thereafter. Accurately measured proportions and thorough mixing were necessary to produce uniformly cured articles. The need for mixing limits useful compositions to those which were easily stirred and poured, thereby limiting polymer viscosity and level of filler loading. In the early development of this system the role of water was not appreciated. Later, it was established that at least catalytic amounts of water were essential and that unless special steps were taken for its rigorous exclusion prior to use, water absorbed on the filler or otherwise present could prematurely catalyze the crosslinking reactions.

Moisture reactive types

The next major development in RTV silicones was the one-part system in which a mixture of all components (except water) remained workable in a sealed container until exposed to misture, such as that present in the atmosphere. The major polymer component was a linear or lightly branched silcone having reactive groups (X) that readily underwent hydrolytic polymerization to form siloxanes as shown by the following reactions:

$$\equiv SiX + H_2O + H_2O \rightarrow \equiv SiOH + HX \qquad (Rxn\ 1)$$

$$\equiv SiX + \equiv SiOH \rightarrow \equiv SiOSi\equiv + HX \qquad (Rxn\ 2)$$

$$\equiv SiOH + \equiv SiOH \rightarrow \equiv SiOSi\equiv + H_2O \qquad (Rxn\ 3)$$

The reactive groups, $\equiv SiX$, could be present in terminal or non-terminal positions or both. A large number of reactive groups were reported in the prior art to be effective. Most commonly used materials were those containing Si—O—C or Si—N< structures, particularly —OMe, —OEt,

—OCMe,

—NMe$_2$, —ONEt$_2$. The crosslinker component used is usually a trifunctional silane, such as

CH$_3$Si(OCCH$_3$)$_3$ or low molecular weight polysiloxane, wherein three or more identical reactive groups are present per molecule. A wide variety of catalysts are used; the choice depending on the nature of X. Metal and amino carboxylate salts are often useful. While cross-linkers of this type are highly effective, they do possess limitations. For instance, polyfunctional silane monomers represent highly concentrated sites of funtionality. They are therefore not well suited as means for modifying the properties of the cured sealant. The presence of identical functional groups upon the cross-linker also poses problems concerning workability of the sealant composition since gellation times and curing times vary little. This may be remedied by employing sealants containing mixtures of cross-linkers. However, problems associated with proper distribution of the cross-linkers within the sealant composition then occur.

Utility of the moisture reactive type of RTV silicon is limited by the nature of the by-products HX (see Rxn 1,2) which can be objectionably acidic, toxic, corrosive, malodorous or, in some other way, undesirable. This limitation has stimulated the search for RTV silicon systems which form only innocuous by-products or even none at all.

Vinyl-hydrosiloxane type

In this more recent development, crosslinking is accomplished by hydrosilylation as in the following reaction:

$$\equiv SiH + CH_2=CHSi\equiv \rightarrow \equiv SiCH_2CH_2Si\equiv \qquad (Rxn\ 4)$$

The major polymer components is usually a linear or lightly branched silicone with vinyl or other olefinic groups in terminal or non-terminal positions. The crosslinker is usually a low molecular weight siloxane with three or more hydrosiloxane units per molecule. Catalysts are typically platinum compounds which are effective at parts per million (ppm) levels. Compositions of this type which are active at room temperature are two-part systems. One-part systems are made with inhibited catalysts but require elevated temperatures for at least brief periods to activate the catalyst and are therefore not true RTV systems.

A weak point of this kind of crosslinking system is that the platinum catalyst can be poisoned by many substances. A significant advantage is that undesirable by-products are not formed.

Oxygen curable mercaptoalkyl type

In this most recently developed type of RTV silicone, crosslinking occurs by oxidation of mercaptoalkyl substituents upon contact with molecular oxygen, as in $$2\equiv Si-R-SH + \tfrac{1}{2}O_2 \rightarrow \equiv Si-R-S-S-R-Si\equiv + H_2O \quad \text{(Rxn 5)}$$

The major polymer components is a linear or lightly branched silicone havig mercaptoalkyl substituents, such as 3-mercaptopropyl, on silicon. Crosslinker components are optional and are usually low molecular weight silicons having three or more mercaptoalkyl substituents per molecule. Catalysts are organic compounds of prooxidant metals such as cobalt.

With respect to limitations imposed by by-products, in this system the major by-product is water (Rxn 5) which is considered to be relatively innocuous and which can usually be tolerated or, if necessary, removed in many applications. However, under some conditions, side reactions may result in the formation of small amounts of malodorous and toxic hydrogen sulfide. Furthermore, in contact with sensitive surfaces, such as silver or copper, unreacted mercaptoalkyl groups may have undesirable interactions. Also, compositions containing disulfide linkages (Rxn 5) can degenerate with formation of corrosive sulfur compounds such as sulfurous and sulfuric acids on exposure to moisture and air at elevated temperatures.

RTV sealant compositions often also contain non-reactive silicone oils as viscosity modifiers. However, while these oils do indeed aid in the formulation of the sealant, their presence in the crude product is often undesirable since their non-reactive nature allows them to bleed out of the cured material.

In view of the inadequacies associated with the various RTV compositions discussed above, there is a need for RTV compositions which are not associated with undesirable by-products and which possess more varied physical properties than compositions of the prior art afford. While this latter quality may be partly attainable through the use of a mixture of different cross-linkers within a give sealant composition, this leads to variations in their concentration throughout the composition.

It is therefore an object of the present invention to provide non-acidic polyorganosiloxane cross-linkers, which possess mixed functionalities, for incorporation into RTV silanol formulations thereby producing RTV materials having novel properties.

It is another object of the present invention to provide non-acidic polyorganosiloxane cross-linkers which possess dispersed cross-linking sites.

It is further a specific object of the present invention to provide RTV compositions possessing excellent adhesion qualities, deep cure, high flexibility and low compression set.

It is still another specific object of the present invention to provide RTV compostions possessing excellent adhesion qualities and structural strength.

It is still another object of the present invention to provide novel methods for the manufacture of the claimed polyorganosiloxane cross-linkers.

SUMMARY OF THE INVENTION

The present invention provides novel polyorganosiloxane cross-linkers for incorporation into conventional RTV formulations and to the RTV sealants so provided.

More specifically, this invention relates to novel polyorganosiloxane cross-linker of the formula

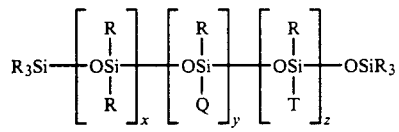

wherein

R represents a $C_1$–$C_{12}$ alkyl, $C_6$–$C_{12}$ aryl $C_6$–$C_{12}$ arylalkyl group, a $C_5$–$C_{12}$ cycloalkyl group and may be the same or different;

Q represents either

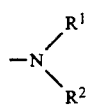

wherein $R^1$ and $R^2$ may be hydrogen, a $C_1$–$C_{12}$ alkyl radical, a $C_1$–$C_{12}$ alkoxy radical, $C_6$–$C_{12}$ aryl or aralkyl radical or $R^1$ and $R^2$ may together be a divalent hydrocarbon radical which forms a heterocyclic ring with the nitrogen atom to which said divalent radical is attached; or Q represents

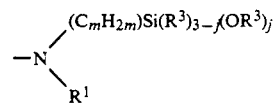

wherein m is an integer having a value of from 2 to about 6, $R^3$ is selected from the group consisting of hydrogen and $C_1$–$C_{12}$ alkyl groups, and j is an integer having a value of from 1 to 3; and T represents either —O—$R^4$ wherein $R^4$ is selected from the group consisting of 1) hydrogen; 2) a $C_1$–$C_{12}$ alkyl group 3) a $C_1$–$C_{12}$ alkyl-substituted amine group, 4) the group

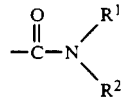

wherein $R^1$ and $R^2$ are as defined above, or are —$(C_mH_{2m})$—Si—$(R^3)_{3-p}(OR^3)_p$ wherein m has a value of 2 to about 6, p has a value of 1 to 3 and $R^3$ is as previously defined, or $R^4$ may also represent the group 5) 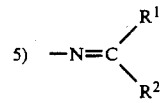

wherein $R^1$ and $R^2$ are as previously defined; or T represents

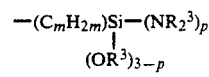

wherein p is as previously defined.

x is an integer having a value of from 0 to about 20,000;

y is an integer having a value from 0 to about 100;

z is an integer having a value of from 0 to about 100 with the following provisos: 1) the sum of y+z must be equal to or greater than 2, and 2) when z is zero, Q, can not all be identical.

It has been found that the use and selection of the above-defined compounds, which bear mixed functionalities located along a polysiloxane chain, allow the manufacture of an RTV material having properties which can be tailored to suit the intended end-use of the material.

DESCRIPTION OF THE INVENTION

The organosiloxane cross-linkers of this invention are generically represented by the formula

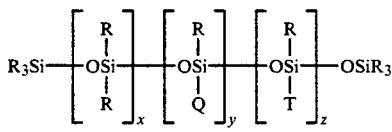

wherein

R represents a $C_1$–$C_{12}$ alkyl, $C_5$–$C_{12}$ cycloalkyl, $C_6$–$C_{12}$ or a $C_1$–$C_{12}$ alkylaryl, and may be the same or different;

Q represents either

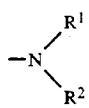

wherein $R^1$ and $R^2$ may be hydrogen, a $C_1$–$C_{12}$ alkyl radical, a $C_1$–$R_{12}$ alkoxy radical, $C_6$–$C_{12}$ aryl or aralkyl or $R^1$ and $R^2$ may together be a divalent hydrocarbon radical which forms a heterocyclic ring with the nitrogen atom to which said divalent radical is attached; or Q represents

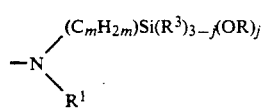

wherein m is an integer having a value of from 2 to about 6, $R^3$ is selected from the group consisting of hydrogen and $C_1$–$C_{12}$ alkyl groups, and j is an integer having a value of from 1 to 3; and T represents either —O—$R^4$ wherein $R^4$ is selected from the group consisting of 1) hydrogen, 2) a $C_1$–$C_{12}$ alkyl group 3) a $C_1$–$C_{12}$ alkyl-substituted amine group, 4) the group

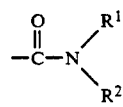

wherein $R^1$ and $R^2$ are as defined above, or are —($C_m H_{2m}$)—Si—$(R^3)_{3-p}(OR^3)_p$ wherein m has a value of 2 to about 6, p has a value of 1 to 3 and $R^3$ is as previously defined, or $R^4$ may also represent the group

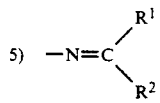

wherein $R^1$ and $R^2$ are as previously defined; or T represents

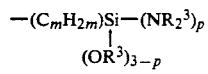

wherein p is as previously defined.

x is integer having a value of from 0 to about 20,000;

y is an integer having a value from 0 to about 100;

z is an integer having a value of from 0 to about 100 with the following provisos: 1) the sum of y+z must be equal to or greater than 2, and 2) when z is zero, Q, can not all be identical.

Included with the scope of this invention are several preferred subgeneric classes of polyorganosiloxane cross-linkers, these subgeneric classes are set forth below as formulae I through V. Within each of these subgeneric classes are various species which, in turn, are preferred embodiments of the invention.

The first subgeneric class of polyorganosiloxane cross-linkers are of the formula

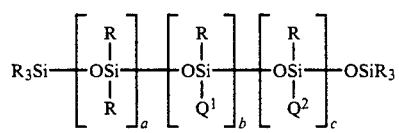

(I)

wherein

R represents a $C_1$–$C_{12}$ alkyl group, a $C_5$–$C_{12}$ cycloalkyl group a $C_6$–$C_{12}$ arylalkyl group, and may be the same or different;

$Q^1$ represents

wherein $R^6$, $R^7$ may be hydrogen, a $C_1$–$C_{12}$ alkyl group, a $C_1$–$C_{12}$ alkoxy group, or $R^6$ and $R^7$ may together be a divalent hydrocarbon radical which forms a heterocyclic ring the nitrogen atom to which said nitrogen atom is attached;

$Q^2$ is selected from those groups defined as $Q^1$;

a is an integer having a value of from 1 to about 20,000;

b is an integer having a value of from 1 to about 99;

c is an integer having a value of from 1 to about 99;

the sum of b+c must be equal to or greater than 2 and $Q^1$ and $Q^2$ can not be identical.

Preferably, R represents a $C_1$–$C_6$ alkyl group, most preferably a methyl group. Preferably, $R^6$ and $R^7$ are $C_1$–$C_8$ alkyl groups or together $R^6$ and $R^7$ together from a morpholine radical, piperzine radical or a N-methylpiperazine radical. Preferably, the ranges of a, b, and c are about 5 to about 100, about 1 to about 20, and about 1 to about 20, respectively.

Compounds of the formula (I) may be prepared by one of two processes. In the first process, the preparation of a silyamine fluid is prepared as taught in U.S. Pat. No. 3,530,092. This involve the sequential reaction of an organosiloxane polymer free of aliphatic unsaturation and containing silicon-bonded hydrogen atoms with first and second amines in the presence of a platinum catalyst. Reaction temperatures of up to 330° C. may be employed, depending upon the particular reactants and the catalyst present. The reaction pressure is not critical, however, super atmospheric pressures may be preferable in the case where low-boiling amines are employed. According to the reference, the order of addition of the reactants is immaterial. The progress of the reaction is then monitored through measurement of evolved hydrogen.

The polyorganosiloxanes of formula (I) may be prepared by 1) reacting a first amine reactant with all available Si—H bonds, followed by a conventional amine-amine exchange reaction on at least a portion of the Si-amine sites with a second amine, or 2) leaving at least a portion of the Si—H bonds unreacted with the first amine, either through the use of less than a stoichiometric amount of the first amine or early termination of the first reaction, followed by isolation of the partially aminated fluid and the subsequent reaction of the remaining S—H bonds with a second amine, or by reaction with a mixture of said first and second amines.

The instant process involves the use of a platinum catalyst. The term platinum catalyst is used to define and encompass the metal platinum, supported and unsupported platinum, platinum compounds and platinum complexes. Such catalysts are well known in the art as seen for example by U.S. Pat. Nos. 2,823,218, 2,851,473 and 3,410,886. Illustrative of the above mentioned types of catalysts are platinum, platinum-on-alumina; platinum-on-charcoal; chloropltainic acid, platinum black; platinum-olefin; platinum-cycloalkane; bis(benzonitrile)dichloroplatinum (II); bis(phenyl-butyronitrile)dichloroplatinum (II); and the like. While obviously only a catalytic amount of platinum catalyst is necessary for the instant reaction, the amount of platinum catalyst may vary over a wide range. Generally about 5 to about 1000 parts by weight per million parts by weight of platinum catalyst is employed based on the weight of the total reactants, while the preferred range is from about 20 to about 500 parts by weight per million parts by weight.

While conducting the production of the polyorganosiloxanes of formula (I) through the above-described general procedure, it should be noted that the reactions of some amines, such as morpholine and N-methylpiperazine, involved induction periods of varied and unpredictable duration. Furthermore, the reaction once begun proceeds with variable rates to various stages of completion. Moreover, sudden evolution of substantial quantities of hydrogen gas are sometimes evolved following prolonged periods during which the reaction may be thought to be completed. In short, the addition of amines to Si—H fluids is sometimes unpredictable and therefore unsatisfactory.

Therefore, a second and novel process for production of the polyorganosiloxanes of formula (I) has been developed. This is based upon the unexpected finding that the order of addition of the reactants is indeed critical, notwithstanding the disclosure of U.S. Pat. No. 3,530,092 which states otherwise. It has been found that initial contacting of the platinum-containing catalyst with the Si—H fluid at elevated temperatures allows for immediate reaction of the amines upon their introduction. This improved process thereby produces a predictable amination reaction without the occurrence of an induction period. Moreover, since no induction period is present, amines having relatively low boiling points, e.g., <140° C., may be reacted under atmospheric pressure as long as they are introduced slowly into the reaction mixture so as not to overwhelm the reaction. The rate at which the amines may be introduced into the reaction mixture in this process varies with the reactivity of each amine species.

Of course, to allow for the generation of mixed silylamines, as in the first described amination procedure, some Si—H groups may be left unreacted in the frist amination reaction to allow for remaining Si—H reaction sites for the second amination reaction. Likewise, the Si—H groups may be totally aminated, followed by insertion of an —O—R$^8$ functionality as defined below through a substitution reaction. The reaction conditions as well as the catalysts employed in this improved process may be the same as those described in the conventional process for the production of silylamines.

Production of the polyorganosiloxanes of formula (I) are demonstrated in Example 25 which follows.

Also included within the scope of this invention are polyorganosiloxane cross-linkers of the formula:

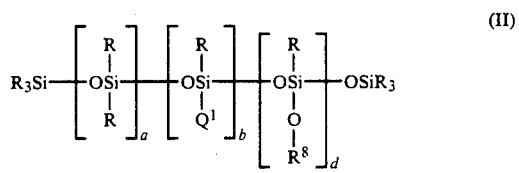

(II)

wherein

R$^8$ is hydrogen, a $C_1$–$C_{12}$ group a $C_1$–$C_{12}$ alkyl-substituted amino group or the group

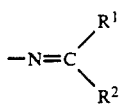

wherein R$^1$ and R$^2$ are as previously described.

Q$^1$ represents

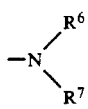

as previously defined;

R, a and b are as defined above; and d is an integer having a value of from 1 to 99

Preferably, R represents a $C_1$–$C_6$ alkyl group, most preferably a methyl group. Preferably, R$^1$, R$^2$, R$^6$ and R$^7$ are $C_1$–$C_8$ alkyl groups, or together R$^6$ and R$^7$ form a morpholine radical, piperazines radical or a N-methylpiperazine radical. Preferably, R$^8$ is a $C_1$–$C_4$ alkyl group or the group

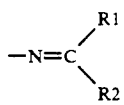

as previously defined. Preferably, a ranges from about 5 to about 100, while b ranges from about 1 to about 20. Preferably, d ranges from 1 to 20.

Production of the compounds of formula (II) may be accomplished by reacting the base Si—H containing silanol fluid with an amino compound in the manner discussed in the formation of the silylamines of formula (I).

For instance, the remaining Si—H bonds are then reacted with a compound which is appropriate for the insertion of the desired —O—R$^8$ group in the molecule. For instance, the group —O(CH$_2$)$_2$N(CH$_3$)$_2$ may be reacted with an Si—H group through provision of 2-[N,N-dimethylamino]ethanol. The group, —O—R$^8$ may also be inserted through a substitution reaction with an Si—Q$^1$ group produced in the initial amination of the silanic fluid, as shown in Example 21 below.

Typical catalysts and reaction conditions which may be employed are identical to those used in the formation of the compounds of formula (I).

Production of the compounds of formula (II) is demonstrated in Examples 19 to 22 and 26 of this application.

Also included within the scope of the present invention are polyorganosiloxane cross-linkers of the formula

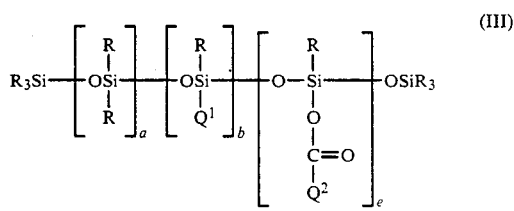

(III)

wherein Q$^2$ represents

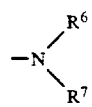

as previously described; e is an integer having a value of from 1 to about 99; and R, R$^6$, R$^7$, Q$^1$, a and b are as defined above.

Preferably, R represents a C$_1$-C$_6$ alkyl group, most preferably a methyl group. Preferably, R$^6$ and R$^7$ may be hydrogen, a C$_1$-C$_6$ alkyl radical, a C$_1$-C$_6$ alkoxy radical or together R$^6$ and R$^7$ form a morpholine radical, piperadine radical or a N-methyl piperazine radical. Preferably, a ranges from about 5 to about 100, while b ranges from about 1 to about 20. Preferably, e ranges from about 1 to 20.

Production of the compounds of formula (III) may be accomplished by first inserting the groups Q$^1$ and Q$^2$ as previously described in the discussion concerning production of the compounds of formula (I). The carbamate functionality can then be inserted by exposure of the resulting silylamines to carbon dioxide in an amount not less than that required to convert at least some of the amine moieties to carbamate groups. This is most readily accomplished by bubbling the gaseous carbon dioxide through the fluid.

Production of the compounds of formula (III) is demonstrated in Examples 32 to 34 below.

Also included within the scope of this invention are polyorganosiloxane cross-linkers of the formula

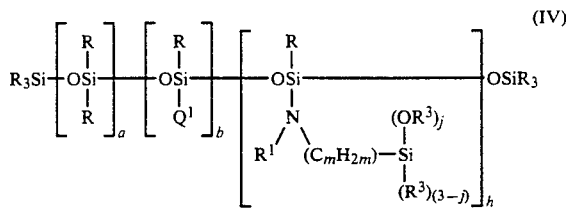

(IV)

wherein

R$^3$ is selected from the group consisting of hydrogen and a C$_1$-C$_{12}$ alkyl group;

m is an integer having a value from about 2 to about 6;

j is an integer having a value of 1 to 3;

h is an integer having a value from 1 to about 99; and R, R$^1$, Q$^1$, a and b are as previously defined.

Preferably, R represents a C$_1$-C$_6$ alkyl group, most preferably a methyl group. Preferred Q$^1$ groups are as previously described. Preferably, R$^6$ is hydrogen or a C$_1$-C$_4$ alkyl radical. R$^3$ is preferably hydrogen or C$_{1-4}$ alkyl. Preferably, a ranges from about 5 to about 100, while b ranges from 1 to about 20. Preferably, h ranges from 1 to about 20. Preferably, j is 3.

Production of the compounds of formula (IV) may be accomplished by the platinum catalyzed addition of an aminoalkylsilane to the Si—H bonds of the silanol fluid. Catalysts, their concentration and the conditions under which the reaction is conducted are as described in the preparation of compounds of the formula (I).

The compounds of formula (IV) possess the advantage when introduced into RTV compositions of combining the Si—N hydrolysis cross-linking reaction of normal silylamine fluids with the concomitant release of an amine that will not only react in the composition but will provide an adhesion-promoting benefit while doing so.

Production of the compounds of formula (IV) is demonstrated in Examples 23 through 25 below.

Also included within the scope of this present invention are polyorganosiloxane compounds of the formula

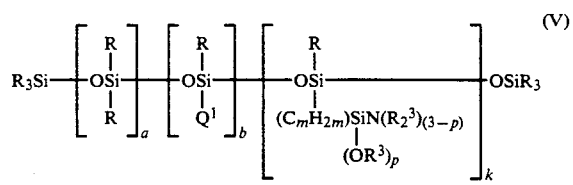

(V)

wherein k is an integer having a value of from 1 to about 99; j is an integer having a value of from 1 to 3; and R, R$^3$, Q$^1$, a, m, and b are as defined above.

Preferably, k ranges from about 1 to about 20, while p is preferably 3. Preferred ranges from R, Q$^1$, R$^3$, a and b are as previously set forth.

Production of the compounds of formula (V) may be accomplished by the platinum catalyzed addition of vinyltris(dialkylamino)silane to an Si—H bond present on the silanic fluid. Catalysts, its concentration and the conditions under which the reaction is conducted are as described in the preparation of the compounds of formula (I).

Unlike the compounds of formula I, II and III, the compounds of formula V possess grouped hydrolyzable silicon functionalities. These materials differ from those containing randomly placed monofunctional silicon atoms and accordingly offer the option of providing cross-linking sites in the same overall density as in the other types of fluids, but at different local concentrations. This difference is believed to alter the modulus and flexibility of the sealant compostion in which they are incorporated.

Production of the compounds of formula (V) is demonstrated in Examples 27, 28, and 31 below.

The silanol fluids used in conjunction with the polyorganosiloxane cross-linkers or the present invention are hydroxy-end blocked polydiorganosiloxanes having a viscosity at 25° C. of from 0.07 to 15.0 pascal-seconds. The hydroxy-end blocked polydioranosiloxanes have organic groups selected from methyl, ethyl, phenyl and 3,3,3-trifluoropropyl radicals. The organic groups of the hydroxy-end blocked polyorganosiloxane contain no more than 50% phenyl or 3,3,3-trifluoropropyl radicals based upon the total number of organic radicals in the hydroxy-end blocked polydiorganosiloxane. Other monovalent hydrocarbon radicals and halogenated monovalent hydrocarbon radicals may be present in small amounts in the hydroxy-end blocked polydiorganosiloxane. The diorganosiloxane units of the hydroxy-end blocked polyorganosiloxane can be, for example, dimethyl siloxane, diethyl siloxane, ethylmethyl siloxane, diphenyl siloxane, methylphenyl siloxane, and 3,3,3-trifluoropropylmethyl siloxane. The term hydroxy-end blocked polyorganosiloxane as used herein does not preclude the presence of minor amounts of other siloxane units, such as monooranosiloxane units. The hydroxy-end blocked polydiorganosiloxanes are well known in the art and can be made by known commercial techniques. The preferred hydroxy-end blocked polydiorganosiloxane is hydroxy-end blocked polydimethylsiloxane.

The amount of polyorganosiloxane cross-linker employed in the compositions of this invention can vary depending, among other factors, on the desired rate of cross-linking and on the hydroxy-end blocked polydiorganosiloxane employed. In general, the amount of polyorganosiloxane cross-linker employed can be from about 0.1 percent to about 50 percent by weight based on the weight of the hydroxy-end blocked polydiorganosiloxane. Preferably, the amount of the claimed cross-linker employed will be from about 0.8% to about 10% and most preferably from about 2% to about 8% by weight based on the weight of the hydroxy-end blocked polydiorganosiloxane.

The sealant compositions of this invention can be produced by mixing the above two components at room temperature or elevated temperatures preferably between about 20° C. to about 100° C. The mixing can be conducted at atmospheric, superatmospheric or subatmospheric pressures.

The compositions of this invention vulcanize or cure into a cross-linked, three-dimensional network upon exposure to moisture, such as that present in the atmosphere. The curing of the compositions of this invention produces crosslinked silicone elastomeric polymers and non-corrosive, low molecular weight and non-acidic by-products.

The cure rate of the compositions of this invention is dependent on atmospheric temperature, relative humidity, the presence or absence of a silanol condensation catalyst, and the like, but, in general, the compositions of this invention will cure to a tack-free state in a relatively short period of time. Preferably, the compositions should not cure to a tack-free state in less than about 15 minutes to allow for a practical working ("tooling") time. As a practical matter, it is preferable to allow the compositions of this invention to continue curing beyond the period of time required to achieve a tack-free elastomer. This is desirable to assure that the elastomer will be fully cured, i.e., that the reaction of the siloxanes with the moisture and with each other is complete. The elastomers formed from the compositions of this invention will generally be fully cured in less than seven days.

It is generally preferred to employ a catalyst to facilitate the vulcanization. Any well known silanol condensation catalyst may be employed, for example, alkyl titanates, organosilicon titanates, metal salts of carboxylic acids such as stannous octoate, dibutyltindilaurate and the like, amine salt such as dibutylamine-2-ethylhexoanate and the like, or other conventional acidic or basic catalysts. The catalyst can be added during or after the preparation of the composition and is used in an amount sufficient to cure the composition upon exposure to moisture, for example from about 25 to about 5000 parts by weight per million parts by weight of the composition.

The compositions of this invention can also be modified by incorporating therein any of the conventional elastomer fillers, e.g., reinforcing fillers, such as fumed silicas, silica aerogels and precipitated silicas of high surface area. Nonreinforcing fillers can also be used, for example, coarse silicas such as diatomaceous earth, crushed quartz or metallic oxides, such as titania, ferric oxides, zinc oxide, talc calcium carbonate and the like. In addition fibrous fillers such as asbestos or glass fibers or filaments may be used. In all cases, it is desirable that the filler be substantially dry before being admixed with the polymers. The fillers are generally employed to upgrade physical properties and to modify the flow characteristics of the uncured polymer. The fillers can comprise as much as 70% by weight of the total weight of the composition provided that no more than 30% by weight of the total weight of the composition are reinforcing fillers. Preferably the fillers will comprise from 0% to about 40% by weight of the total weight of the composition provided that only from 0% to 20% by weight of the total weight of the composition are reinforcing fillers.

The compositions of this invention may also contain modifiers such as resinous siloxane modifiers as plasticizers (e.g., trimethylsilyl-capped polydimethylsiloxane) or to make the cured polymers more dough-like and less resilient, as well as additives such as pigments, UV stabilizers, oxidation inhibitors and the like or dielectric substances such as graphite and carbon black. It is immaterial whether these fillers, modifiers or additives and the like are added to the sealant compositions of this invention during or after their preparation as described herein. However, it is most preferable that they be added under substantially anhydrous conditions.

It will be understood that the compositions of this invention can comprise mixtures of the polyorganosiloxane cross-linkers defined by this invention as well as combinations of the polyorganosiloxane cross-linkers of this invention with minor amounts of other silicon-based cross-linkers or chain extenders (e.g., methyltrimethoxysilane or dimethyldimethoxysilane) to selectively alter the inherent properties of the composition such as, e.g., cure rate, flexibiltiy and elongation of the cured polymer, and the like.

The compositions of this invention should be stored in the absence of moisture to avoid viscosity buildup or gellation. Compositions of this invention have excellent storage stability (usually greater than six months) when stored in the absence of moisture.

The vulcanized polymers produced from the compositions of this invention are useful in coating applications and in caulking and sealing applications on buildings, airplanes, bathroom fixtures, automotive equipment or wherever elastomeric polymers are employed. Another desirable feature of these compostions is their ability to be applied to moist or wet surfaces and be cured into a cross-linked elastomer without deleterious effects. Moreover, the cured compositions of this invention strongly adhere alone or with the aid of a primer to a wide variety of substrates such as glass, porcelain, wood, metals, polymeric materials and the like making them especially suited for many types of caulking, adhesive or laminating application.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Example 1

A 1-liter 4-necked flask was equipped with a mechanical stirrer, reflux condenser, side arm addition funnel, and thermometer and dried by heating under a slow stream of dry nitrogen. The cooled apparatus was then maintained under a nitrogen cover, but without flushing, and connected to a silicone oil bubbler. The flask was charged with 200 g of a silanic fluid equilibrate containing 1.23 eq of SiH having an average formula of

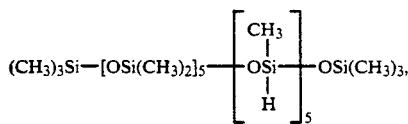

and the fluid was heated to 130° C. while being stirred. Chloroplatinic acid (CPA) catalyst was then added (1.0 mL of solution in dimethoxyethane, 10 mg Pt/ml) and allowed to heat for 2 min. Morpholine (117 g. 9% excess, KOH-dried) was then added slowly from the addition funnel under rapid stirring of the reaction mixture, which immediately began to evolve hydrogen gas. The initially exothermic reaction temperature was maintained at 130°-136° as the amine was added over 1 hr. Gas evolution suddenly ceased after a further 20 min., and the clear, amber oil was then allowed to cool. The cloudy oil that resulted was filtered under nitrogen pressure and stripped at 1 mm pressure and 50° for 0.5 hr. to give the final product in 93 wt-% yield and containing 95% of the theoretical nitrogen titratable in isopropanol with aqueous 0.1 N HCl. The stripping condensate was largely morpholine, of which the excess and about 10% of the stoichiometric amount originally needed for reaction was recovered.

Example 2

To a 500-ml flask equipped as in Example 1 was charged 100 g of the silanic fluid of Example 1, 57.5 g (7% excess) of morpholine, and 20 mL of toluene. Upon heating the solution to 95°, a very slow, steady evolution of gas was observed. Addition of 50 ppm platinum catalyst as CPA then produced an immediate and vigorous rate of gassing, which slowed after 30 minutes while heating the reaction solution to 96°-112°. The reaction mixture recatalyzed with an additional 50 ppm platinum, but the gas evolution rate continued to decrease over the next 1.25 hr. A sample of the reaction mixture was then found to contain more than 50% unreacted SiH. A third catalysis and heating for 30 min. at 120°- failed to increase the reaction rate. The mixture was cooled for 16 hr., then reheated to 120°, whereupon gassing commenced vigorously and then died out after 30 min. Analysis revealed no SiH remained. Workup and analysis showed 88% of the theoretical titratable nitrogen and an 89 wt-% yield.

Example 3

A 100-ml flask equipped as in Example 1 was charged with 20 g (0.123 equiv. of SiH) of the silanic fluid of Example 1 which was then heated to 130°, catalyzed with 50 ppm platinum as in Example 1, slowly treated with 12.3 g (0.123 equiv.) of KOH-dried N-methylpiperazine at 132°-136° over 55 min., and finally heated at 135°-150° for 2.5 hr. to the cessation of gassing. Analysis revealed complete consumption of silanic hydrogen.

Example 4

The silanic fulid of Example 1 (100 g, 0.615 equiv.), N-methylpiperazine (66.1 g, 8% excess), and dry toluene (20 ml) were heated to 95°, and 50 mppm platinum catalyst was added. Neither this, nor a further 50 ppm catalyst added 10 min. later at 100°, produced any significant gas evolution, nor did further heating at 110°-134° over 2.5 hr. The cooled reaction mixture was reheated the next day at 128°-135° for 3.5 hr. This produced an initial, slow gassing that tapered off to about nil after 2.5 hr. Analysis revealed that the majority of the SiH remained unreacted.

Example 5

A reaction was begun as in Example 3, except that 100 ppm of platinum catalyst was added at 130° prior to adding 10.9 g (2% excess) of dry piperidine over 20 min. in the temperature range 125°-139°. After a further 10 min. reaction at 125°-131°, gassing ceased and consumption of SiH was found to be complete.

Example 6

The apparatus of Example 1 was charged with 200 g of silanic fluid of Example 5, 118 g (10% excess) dry piperidine, and 25 mL toluene. The solution was heated to 80° and 1 mL of chloroplatinic acid solution (50 ppm platinum) was added. Substantial gas evolution began at 92° and then tapered off over 25 min. at 92°-114°. A further 50 ppm quantity of catalyst was added, but the reaction rate remained very slow over the next 35 min. at 114°-115°. A final 50 ppm quantity of catalyst was then added which led to an increasingly rapid, second stage of gas evolution over the next 3.2 hr. at 115°-134° and complete consumption of silanic hydrogen. The product was nitrogen pressure-filtered with 1.0 g charcoal and stripped to give 96 wt-% of pale yellow, crystal clear oil containing 95% of the theoretical titratable nitrogen.

Example 7

To the apparatus of Example 3 was charged 25 g of silanic fluid of Example 5 (0.154 equiv. of SiH), 4 mL of dry toluene, and 14.9 g (10% excess) dry piperidine. To the stirred mixture at 22° was added chlorobis(triphenylphosphine)platinum (II) hydride catalyst in 1 mL toluene equal to 100 ppm platinum relative to the silanic fluid. Slow gassing began at 30° as the solution was heated. The gas evolution became very active at 53° but steadily slowed and ended at 70° after 30 min. total heating, although the major portion of silanic hydrogen remained unreacted. Recatalysis 1 hr. later at 102° with 100 ppm platinum in the form of chloroplatinic acid solution revived the hydrogen evolution for 1 hr. at 102°–117°, but substantial silanic hydrogen still remained unreacted.

Example 8

25 g of silanic fluid of Example 5, 14.4 g morpholine, and 7 mL toluene (as a foaming controller) were treated at 100° with about 50 ppm Pt of the solid catalyst complex of Example 7, a vigorous reaction caused foaming up into the condenser and was controlled by cooling. Upon reheating at 110°–120° for up to 5 hr. after addition of a further 150 ppm of the catalyst, no further reaction occurred and substantial silanic hydrogen remained unreacted. When the reaction was repeated, except that 150 ppm of catalyst was added at room temperature, gas evolution began and progressed at an increasing rate upon heating, but there still remained substantial unreacted silanic hydrogen after 5.5 hr. at 110°–117°.

Example 9

0.123 equiv. of the silanic fluid of Example 5 and a stoichiometric amount of piperidine was heated at 115°–125° for 22 hr. in the presence of 5% Pd/C in an amount comprising 200 ppm palladium relative to the silanic fluid. Only a very slight decrease in the SiH content of the mixture was observed.

Example 10

To the flask of the apparatus of Example 3 was charged 23.6 g (0.10 equiv.) of a silanic fluid having an average formula of

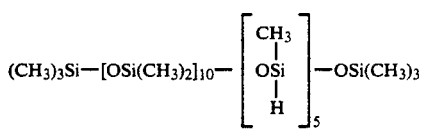

and to the addition funnel 8.7 g (0.10 equiv.) of dry morpholine. The fluid was heated to 138°, catalyzed with 100 ppm platinum in the form of the CPA solution of Example 1, and treated slowly with the amine after 10 min. and over 1 hr. at a temperature varying between 140°–153°. After a further 1 hr. heating at 138°–142° the SiH content was nil, and the mixture was cooled, filtered, and stripped to give 94 wt-% of product oil containing 91% of the theoretical titratable nitrogen (sample 10962–08B).

Example 11

Example 10 was repeated, except using silanic fluid of Example 10 from which had been distilled 12.5 wt-% of volatiles to bp 65° at 0.15 mm pressure. The residue contained the same SiH content as the original fluid. The catalyst added at 140° now produced a very dark color in the silanic fluid, in contrast to the pale to medium amber color generated in unstripped fluids. The amine was added at 130°–135° over 1.2 hr. and the mixture heated at 128°–138° for 4.5 hr. and then cooled. The color was now lighter, but a substantial amount of SiH remained unreacted. The mixture was reheated, recatalyzed with 50 ppm platinum at 140°, and heated 2.25 hr. at 140°–163°, whereupon SiH consumption was complete and the product contained the theoretical titratable nitrogen after filtration and stripping.

Example 12

Example 11 was repeated after first adding to the silanic fluid 2 wt-% of monohydrononamethylcyclopentasiloxane. Addition of the catalyst generated the usual amber color, the reaction proceeded to completion over 3.5 hr. at 120°–153°, and the stripped product contained 96% of the theoretical titratable nitrogen.

Example 13

The reaction was carried out by the procedure of Example 10, except that the silanic fluid had an average formula of

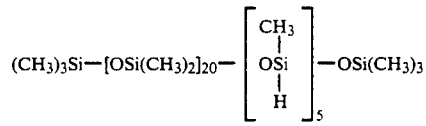

and that only 40 ppm of platinum catalyst was used. The reaction produced a 87 wt-% yield of a product after 2.7 hr. total reaction at 140°–160° that contained 102% of the theoretical titratable amine and contained only a trace of unreacted SiH.

Example 14

Following the procedure of Example 10, 41.7 g (0.05 equiv.) of a silanic fluid having an average formula of

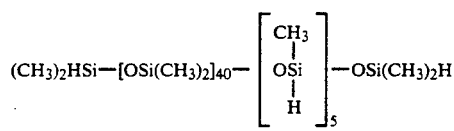

and 0.13 g (4 equiv-%) of tetramethyldisiloxane were heated to 140° and 27 ppm platinum catalyst of Example 10 added, producing a light amber solution. This was then treated with a stoichiometric amount of morpholine (4.3 g) over 10 min. at a temperature ranging between 131°–141° and then heated 3.6 hr. at 137°–155°. The reaction was incomplete, and a further 13 ppm of catalyst was added. This produced a rapid reaction, which was largely complete after 1.25 hr. at 155°–171° and fully complete after another 2 hr. at 155°. The filtered and stripped product contained 101% of the theoretical titratable nitrogen.

Example 15

Applying the procedure of Example 10, 0.1 eq. of a silanic fluid having an average formula of

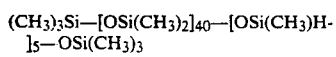

(66.7 g) was heated to 130°, treated with 0.01 equiv-% (29 ppm) of platinum catalyst, and then treated with 0.1 mol of 2-heptylamine over 0.7 hr. at 131°-133°. Heating for 4 hr. at 133°-161° gave an SiH-free product in 88 wt-% yield after filtering and stripping that contained 105% of the theoretical titratable nitrogen.

Example 16

Following the procedure of Example 10, 0.1 equiv. (35.4 g) of a silanic fluid having an average formula of

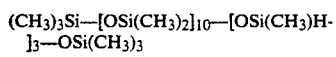

was heated to 140° and treated with 56 ppm of platinum catalyst. After 5 min., the yellow solution was treated with the stoichiometric amount of piperidine over 20 min. at a temperature ranging between 132°-146°, heated for 30 min. thereafter at 142°-155°, filtered and stripped to 91 wt-% of product fluid containing 84% of the theoretical titratable nitrogen.

Example 17

The reaction was carried out similarly to Example 10 with 0.1 equiv. (35.4 g) of the silanic fluid of Example 16, 0.1 mol of aminopropylmorpholine added over 1.5 hr. at 125°-135°, and 100 ppm platinum relative to the fluid. After heating for an additional 2.5 hours at 125°-153°, a filtered, stripped, SiH-free product was obtained in 95 wt-% yield containing 105% of the theoretical titratable nitrogen.

Example 18

The reaction was carried out according to Example 10 with 0.1 equiv. of the silanic fluid of Example 16, catalyzation at 137° with 100 ppm of platinum, and addition of 0.1 mol of 3-aminopropyltriethoxysilane over 1.3 hr. between 135°-146°. The reaction solution was immediately cooled, filtered and stripped to afford the SiH-free product in 98 wt-% yield containing 100% of the theoretical titratable nitrogen.

Example 19

Twenty grams (0.123 equiv.) of a silanic fluid of Example 5 was catalyzed at 142° with 100 ppm of platinum in the form of chloroplatinic acid, heated 5 min., and treated over 0.4 hr. between 42°-152° with 0.05 mol of 2-[N-N-dimethylamino]ethanol, followed in 2 min. by 0.074 mol of piperidine over 0.3 hr. between 136°-145°. After a further 8 min. at 145° there remained no SiH, and the mixture was cooled, filtered, and stripped. The product was obtained in 93 wt-% yield, contained 92% of the theoretical titratable nitrogen, and contained an average of 2 aminoalkoxy and 3 piperidine residues per average molecule.

Example 20

In a reaction similar to Example 19, the amine was added first and the amino alcohol second. Although the reaction apparently proceeded as readily (0.7 hr. to the end of gassing), about 10% of the original SiH remained and was consumed during a further 2 hr. heating at 140°. The product was stripped to give 89 wt-% of the theoretical residue containing 85% of the theoretical titratable amine, and approximately 20% of the original piperidine was recovered in the stripping condensate.

Example 21

A silylamine fluid (26.3 g, 0.10 equiv.) prepared from piperidine and the silanic fluid of Example 5 was treated with 3.4 g (0.04 equiv.) of 2-[N,N-dimethylamino]ethanol and 0.1 mL glacial acetic acid, heated to 100° over 45 min., held at 100° for 30 min., cooled, and vacuum stripped. There was obtained 3.0 g (87% yield) of condensate, identified as piperidine, and 24.9 g of residue, containing 2 dimethylaminoethoxy and 3 piperidine residues per average molecule and 103% of the theoretical titratable nitrogen.

Example 22

To 20 g (0.123 equiv.) of the silanic fluid of Example 5, catalyzed at 150° with 100 ppm platinum was added over 15 min. at 153°-157° 6.4 g (0.049 equiv.) of hydroxyethylmorpholine, followed by 6.5 g (0.075 equiv.) of morpholine over 25 min. at 137°-140°. The mixture was cooled when gas evolution ceased 2 hr. later at 144°-147°. The SiH-free product was filtered and stripped to a 94 wt-% yield of residue containing 2 hydroxyethylmorpholine and 3 morpholine residues per average molecule and 93% of the theoretical titratable nitrogen.

Example 23

To 35.4 g (0.10 equiv.) of the silanic fluid of Example 16 catalyzed at 132° with 100 ppm platinum in the form of chloroplatinic acid was added over 0.5 hr. and between 132°-137° 7.7 g (0.0665 mol) of N,N-diethylethylenediamine. Gassing ceased after 1 hr. further heating at 135°-151°, and 7.4 g (0.335 mol) of 3-aminopropyltriethoxysilane was slowly added. After 0.4 hr. the resulting gas evolution had nearly ceased and the addition was stopped, leaving 0.0085 mol not added and a small SiH content in the product mixture. After 1.1 hr. further heating at 137°-178° with a further addition of 0.004 ml of the aminoalkylsilane, no further reaction had occurred, leaving the mixed fluid product containing 2 diamine residues and 0.75 aminoalkylsilane residue per average molecule.

Example 24

Example 23 was repeated, except that the first amine added was N-methyl-3-aminopropyltrimethoxysilane in an amount of 8.7 g (0.045 mol) over 15 min. at 138°-142°; 3-aminopropylmorpholine (4.9 g, 0.335 mol) was then added 13 min. later over 12 min. at a temperature of between 135°-140°; and, after 3 hr. heating at 127°-133° to the end of gassing, piperidine, (0.8 g, 0.01 mol., a 0.011 mol reaction mixture, cooled after a final 1 hr. heating at 137°-150° to the cessation of gassing, was filtered and stripped to a 96 wt-% yield of the product oil, which contained per average molecule 1.35 aminoalkylsilane, 1.00 aminopropylmorpholine. 0.3 piperidine, and 0.35 unreacted SiH residues, and contained 102% of the theoretical titratable nitrogen.

Example 25

In the apparatus of Example 1, 189 g (0.8 equiv.) of the silanic fluid of Example 10 was heated to 145°, catalyzed with 0.012 equiv-% (100 ppm) of platinum as CPA, heated 3 min., treated over 25 min. between 135°-152° with 55 g (0.64 mol) of morpholine, and heated 1.1 hr. at 135°-152° to the end of gassing. 3-Aminopropylriethoxysilane in an amount of 35 g (0.16 mol), was then added over 12 min. between 148°-170° and the reaction solution cooked out 2.6 hr. until the temperature, lowered by the gassing reaction, had returned to 164°. The cooled SiH-free solution was filtered to remove precipitated catalyst residues and stripped for 30 min. at 50° and 1 mm pressure to give a 98 wt-% yield of product that contained 100% of the theoretical nitrogen and had a flashpoint of 168° F.

Example 26

To the apparatus of Example 3 was charged 35.4 g (0.15 equiv.) of the silanic fluid of Example 10, which was catalyzed at 142° with 100 ppm (0.012 equiv-% relative to SiH) of platinum and, after 2 min., treated with 5.2 g (0.06 mol) of butanone oxime over 14 min. at 144°-149° and heated an additional 1 hr. at 145°-146° to the end of hydrogen evolution. Morpholine, 7.7 g (0.09 mol), was then added over 50 min. between 131°-146° and the mixture cooked out at 140°-152° for 40 min. until the cessation of gassing and complete consumption of SiH. The cooled product was filtered under nitrogen pressure and stripped 1 hr. at 50° and 1 mm pressure to afford 93 wt-% of fluid containing 2 oxime and 3 morpholine residues per average molecule and 95% of the theoretical titratable nitrogen.

Example 27

To the apparatus of Example 3 was charged 37.4 g (0.10 equiv.) of the silanic fluid equilibrate of Example 13, which was catalyzed with 100 ppm 0.019 equiv-%) of platinum as CPA at 125° and then treated over 38 min. between 124°-135° with 18.7 g (0.10 equiv.) of vinyltris(dimethylamino)silane. The reaction mixture was heated from 124°-150° over 45 min., held at 150° for 2 hr., when analysis showed no SiH remained, and cooled. The product contained 101% of the theoretical titratable nitrogen and a H NMR ratio of N—CH$_3$ vs. Si—CH$_3$ groups equal to 1:1.55, compared to the theoretical 1:1.53.

Example 28

In a 500-ml flask equipped as in Example 1 was placed 200 g (0.30 equiv.) of the silanic fluid of Example 15, which was then catalyzed at 128° with 0.02 equiv-% (58.5 ppm) platinum, treated with 56.1 g (0.30 mol) of the vinylsilane of Example 27 over 20 min. at 130°-132°, and heated 5.75 hr. at 130°-160°. The cooled, filtered, and stripped product contained a very small amount of residual SiH and 98% of the calculated titratable nitrogen.

Example 29

To 15.2 g (0.027 equiv.) of the product from Example 27 at 75° was added 4.7 g (0.054 equiv.) of butanone oxime. The mixture was stirred at 75°-120° under a flow of nitrogen for 1.5 hr. to give the product, whose lack of hydroxyl functionality and value of the base titration after stripping revealed the exchange of 1.8 of the theoretical 2.0 dimethylamino residues per trifunctional silicon unit by butanone oxime.

Example 30

To 55.4 g (0.065 equiv. of Si—N residues) of the product fluid from Example 28 was added at 55° 3.0 g (0.065 mol) of absolute ethanol and 0.01 mL trifluoroacetic anhydride catalyst. After 16 hr. at 105°, there was observed a loss of only 0.75 Si—N equivalent, and the mixture was reheated for 4 hours at 100°-120° with a further addition of 0.032 mol of ethanol and 0.02 mL methanesulfonic acid catalyst. This gave a total loss of 1.0 Si—N residue, and no further reaction occurred after another 4 hours of heating.

Example 31

30 g of the fluid product of Example 28 (0.035 equiv. of Si—NMe$_2$) and 2.65 g (0.012 mol) of 3-aminopropyltriethoxysilane were heated to 150° under a flow of nitrogen for 4 hr. and a sample titrated. About 60% of the theoretical 1.0 Si—NMe$_2$ residue per trifunctional silicon atom had been replaced, and no further reaction occurred in 1.5 hr. at 150°. Further treatment of the mixture with 0.050 mL of methanesulfonic acid catalyst for 4 hr. at 145°-150° led to about 85% replacement. Subsequent treatment with 2 drops of triflic acid catalyst and heating 2 hr. at 147°-150° then completed the theoretical reaction to afford a product containing an average of two dimethylamino and one triethoxysilylpropylamino residue bound through nitrogen to each trifunctional silicon atom of the fluid.

Example 32

Twenty-five grams of the silylamine fluid product of Example 15 containing 2-aminoheptane residues in 25 mL hexane was treated at 26° with excess CO$_2$ in a 100-mL flask equipped with a 0.25 in. Teflon dip tube, magnetic stirrer, thermometer, and condenser until the reaction exotherm fell from 31° to 28°. The solution was stripped at 30° for 30 min. at 1 mm to afford the product, whose infrared spectrum contained a strong carbamate carbonyl band at 1710 cm$^{-1}$.

Example 33

Carbon dioxide was bubbled into 31 g (0.126 equiv.) of the silylamine fluid product of Example 6 (piperidine-containing) in the absence of solvent as the temperature rose from 23° to 42°. Approximately 60% of the Si—NR$_2$ residues were converted to carbamate residues Si—OCONR$_2$ according to infrared analysis and weight gain.

Example 34

Carbon dioxide gas was bubbled into 31.3 g (0.089 equiv.) of the mixed silylamine fluid product of Example 25 over 10 min., starting at 21° and ending at 44°, whereupon the weight gain of 1.8 g correspond to conversion of 46% of silylamine to silylcarbamate functions.

Examples 35-56

Sealant Compositions Based on Silylamine Fluid Crosslinkers

Samples were prepared by adding to a 6-oz. hot drink cardboard cup 50 g of a linear, hydroxy terminated polydimethylsiloxane fluid of viscosity about 50,000 cStk and containing a total of about 1.5 meq of silanol residues. There was then mixed in, using a 6 in. tongue depressor stick, an amount of crosslinker compound comprising the milliequivalents shown in the table of hydrolyzable Si—N or Si—O residue groups bound directly to the siloxane chain. Finally, 0.05 mL of dibutyltin dilaurate catalyst was added when the crosslinker compound had been well mixed in. The relative humidity was generally in the range 20–30%. This provided a final sample of about 2 cm depth, in which a solvent cleaned 1×4-inch aluminum strip was immersed.

When fillers were used, a mixture was employed that contained 10 wt-% DeGussa R-972 silanized silica, or PPG HiSil 233 untreated silica, and 90% of the 50,000 cStk silanol fluid (made in quantity in a 1 gal. Ross LDM double planetary laboratory mixer). Samples were generally observed to become a firm in 1–3 days and were then cut and examined at the 6-day mark. Except as noted, an acidic cure-accelerating catalyst was not used, and the samples did not cure through evenly from top to bottom. The comparative examples given in the Table illustrates the various advantageous uses of the reported compositions, as described below.

The abbreviations used in the table are as follows. The structure code is of the form A/B/C-xxx/yyy, where A represents the number per average molecule of unfunctionalized, dimethylsiloxy units, B represents the number of amino or alkoxy residues first reacted in, C represents the number of hydrolyzable residues next reacted in, etc.; xxx represents the compounds reacted in first, yyy represent the compounds next reacted, etc.; and "MOR" denotes morpholine, "PIP" denotes piperidine, "HEMOR" denotes N-(2-hydroxyethyl)morpholine, "oxime" or "Ox" denotes 2-butanone oxime, APTES denotes 3-aminopropyltriethoxysilane, APMOR denotes N-(3-aminopropyl)morpholine, and Me-APTMS denotes N-methyl(3-aminopropyl)trimethoxysilane.

In the general formula A/B/C-xxx/yyy, the group xxx may be derived from $CH_2=CHSi(NMe_2)_3$, which is indicated by $C_2SiN_3$. When one of the $-NMe_2$ groups is replaced by a residue from ethanol or APTES, the structure is abbreviated as $C_2SiN_2(OEt)$ or $C_2SiN_2$-(APTES).

The values of adhesion and firmness are qualitative, relative values, wherein the entry code letters have the meanings: Excellent, Good, Moderate, Poor, Very, Soft, Hard.

Examples 35–40 illustrate the range of firmness, which relates to modulus, that can be achieved in various compositions with constant good adhesion as the nature of the silylamine residue, its concentration relative to dimethylsiloxy units, and the incorporation of fillers are varied.

Examples 41–43 illustrate the difference between sealants based on a mixed functionality fluid vs. a simple mixture of two single functionality fluids, wherein the mixed fluid produced a softer, more adherent sealant. Also shown is the substantial advantage of silylamine over silylalkoxy fluids under comparable conditions, as the latter failed to cure in reasonable times in the absence of a basic catalyst.

Examples 44–46 illustrate the same differences as in Examples 41–43, except between oxime and amine functionalities, wherein the oxime system showed exceptionally poor adhesion unless present in the form of a chemically mixed, silylamine fluid.

Examples 47–53, 62, 63 and 65 illustrate the general efficacy of aminoalkylsilane components, especially (a) when present in mixed fluids where their distribution in a composition is more uniform than when provided as a separate additive, and (b) when used in the presence of a silica filler, when exceptionally strong, snappy, and adherent sealant products were obtained.

Examples 54–56 further illustrate the use of an aminoalkylsilane residue to produce a beneficial effect in a mixed fluid, as a waxy surface otherwise associated with the presence of aminopropylmorpholine residues was rendered normal.

The sealants of Examples 57–61 were prepared as in the proceeding Examples, except that 0.025 mL of glacial acetic acid was used where indicated as a cure acceleration catalyst. The most notable result was the significant improvement of the APTES substituted fluid in Example 60 vs. both the unsubstituted fluid and the use of separately added APTES in giving greatly improved adhesion and a cured-through product.

Examples 64 and 66

The samples were prepared as in Examples 35–56 and designated in the Table as A/B/C/-OCO-xxx/yyy. The major effects of using silylcarbamate vs. silylamine fluids were to greatly accelerate the setting time in the former samples and, in Example 64 vs. 63, to significantly modify the firmness and internal tackiness of the sample.

TABLE 1

SEALANT COMPOSITIONS AND RESULTS

| Example No. | Crosslinker Compound (meq Siloxane-X Groups) | | | Adhesion to Aluminum | Firmness | Other Observations |
|---|---|---|---|---|---|---|
| | From Example No. | Structure Code | Meq | | | |
| 35 | — | 10/3-MOR | 8.0 | E | VS | sticky |
| 36 | — | 10/3-MOR | 6.4 | E | M | rubbery, tacky |
| | 5 | 5/5-PIP | 1.6 | | | |
| 37 | — | 10/3-MOR + R-972 silica | 8.0 | G | VH | rubbery |
| 38 | — | 10/3-MOR + HS-233 silica | 8.0 | E | S | tacky |
| 39 | 13 | 20/5-MOR | 8.0 | E | S | dry |
| 40 | 13 | 20/5-MOR | 6.4 | E | M | rubbery, tacky |
| | 5 | 5/5-PIP | 1.6 | | | |
| 41 | — | 5/5-HEMOR | 8.0 | P | VS | only partially cured |
| 42 | — | 5/5-HEMOR | 3.2 | M | H | rubbery, dry |
| | 1 | 5/5-MOR | 4.8 | | | |
| 43 | 22 | 5/2/3-HEMOR/MOR | 8.0 | G | S | rubbery, tacking |
| 44 | — | 10/5-oxime | 8.0 | — | — | not cured |
| 45 | — | 10/5-oxime | 3.2 | VP | M | rubbery |
| | 10 | 10/5-MOR | 4.8 | | | |
| 46 | 26 | 10/2/3-oxime/MOR | 8.0 | G | S | rubbery |
| 47 | 10 | 10/5-MOR | 8.0 | E | M | rubbery |

TABLE 1-continued

SEALANT COMPOSITIONS AND RESULTS

| Example No. | From Example No. | Crosslinker Compound (meq Siloxane-X Groups) Structure Code | Meq | Adhesion to Aluminum | Firmness | Other Observations |
|---|---|---|---|---|---|---|
| 48 | 10 | 10/5-MOR | 6.4 | E | M | rubbery; cohesive failure |
|  | — | APTES | 1.6 |  |  |  |
| 49 | 25 | 10/4/1-MOR/APTES | 8.0 | E | S | rubbery; cohesive failure |
| 50 | 25 | 10/4/1-MOR/APTES + R-972 silica | 8.0 | VE | VH | snappy, could not tear by hand |
| 51 | 25 | 10/4/1-MOR/APTES + HS-233 silica | 8.0 | VE | H | snappy |
| 52 | 10 | 10/5-MOR | 6.4 | E | S | cohesive failure |
|  | 18 | 10/3-APTES | 1.6 |  |  |  |
| 53 | 18 | 10/3-APTES | 8.0 | — | — | partially cured, from top |
| 54 | 17 | 10/3-APMOR | 8.0 | E | S | rubbery, slightly crumbly, waxy surface |
| 55 | 17 | 10/3-APMOR | 5.0 | G | M | rubbery; waxy surface |
|  |  | 10/3-MOR | 3.0 |  |  |  |
| 56 | 24 | 10/1.35/1/0.3-Me-APTMS/APMOR/PIP | 8.0 | E | S | rubbery; normal surface |
| 57 | 28 | 40/5-$C_2SiN_3$ | 3.0 | P | H | HOAc catalyst |
| 58 | 28 | 40/5-$C_2SiN_3$ | 3.0 | P | H | no catalyst |
| 59 | 28 | 40/5-$C_2SiN_3$ | 2.0 | — | — | HOAc catalyst; uncured center, dry surface |
|  | — | APTES | 1.0 |  |  |  |
| 60 | 31 | 40/5-$C_2SiN_2$(APTES) | 3.0 | G | H | HOAc catalyst; cured through |
| 61 | 30 | 40/5-$C_2SiN_2$(OEt) | 3.0 | P | S | no catalyst |
| 62 | 5 | 5/5-PIP | 6.0 | M | VH | rubber; cure rate greatly accelerated if acid catalyst was used |
| 63 | 25 | 10/4/1-MOR/APTES | 6.0 | E | H | rubbery |
| 64 | 34 | 10/4/1-OCO-MOR/APTES | 6.0 | E | M | self-sealing, tacky internal; dry surface; greatly reduced setting time |
| 65 | 15 | 40/5-$NHC_7H_{15}$ | 6.0 | P | S | tacky bottom |
| 66 | 32 | 40/5-$OCONHC_7H_{15}$ | 6.0 | M | VS | large bubbles, runny center |

Example 67

Example 3 is repeated except that the N-methylpiperazine is replaced with a mixture containing 6.15 g (0.062 equiv.) of KOH N-methylpiperazine and 5.39 g (0.062 equiv.) of KOH dried Morpholine. Analysis reveals complete consumption of silanic hydrogen.

Example 68

One-Package Sealant Composition

An amount of a terminal silylpiperidine fluid having an average formula of $PIP(CH_3)_2Si$—$[OSi(CH_3)_2]$-40—$Si(CH_3)_2PIP$, containing a relative 5 equiv. of Si—N residues was compounded in a cup at 25% relative humidity with 10 wt-% of the silanized silica filler R-972, then mixed with an amount of the piperidine-containing fluid from Example 5 that contained a relative 1 equiv. of Si—N residues. The resulting, gel-like mixture, was catalyzed with 0.001 mL dibutylin dilaurate catalyst per gram of the terminal silylamine fluid. A similar sample was prepared without the tin catalyst. Both the catalyzed and uncatalyzed 1-part mixtures were then charged to separated air tight dispensers. Sample beads were laid, both immediately and after 7 days storage. All four beads cured to colorless, semitransparent, tough and highly elastic residues with excellent adhesion to glass. No apparent change in the 1-part mixtures had occurred during storage.

I claim:

1. A random organosiloxane copolymer of the formula:

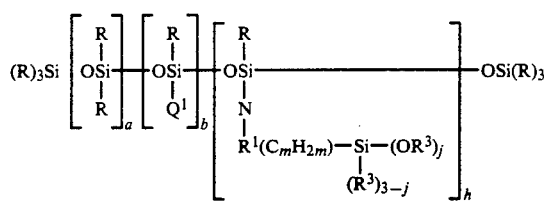

wherein $Q^1$ represents a morpholine radical, each R represents a methyl group, $R^1$ represents a hydrogen atom, each $R^3$ represents an ethyl group, m has a value of 3, j has a value of 3, a has a value of from about 5 to about 100 and b and h each have values of from 1 to about 20.

2. A random organosiloxane copolymer of the formula:

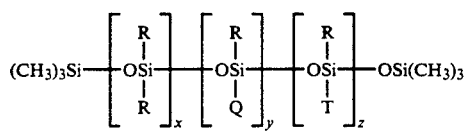

wherein:

(1) R represents an alkyl radical containing from 1 to 12 carbon atoms inclusive, a cycloalkyl radical containing from 6 to 12 carbon atoms inclusive, an aryl radical or an aralkyl radical containing from 6 to 12 carbon atoms inclusive, and wherein R may be the same or different;

(2) Q represents a group represented by the formula:

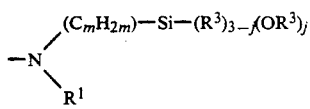

wherein $R^1$ is selected from the group consisting of hydrogen, a $C_1$-$C_{12}$ alkyl radical, a $C_6$-$C_{12}$ aryl, and a $C_6$-$C_{12}$ aralkyl radical, m is an integer having a value of from 2 to about 6 inclusive, $R^3$ is an alkyl radical containing from 1 to 12 carbon atoms inclusive, and j is an integer having a value of from 1 to 3 inclusive; and (3) T represents:

(a) a group represented by the formula: —O—$R^4$, wherein $R^4$ is selected from the group consisting of:

(i) an alkyl radical containing from 1 to 12 carbon atoms inclusive, (ii) an alkyl-substituted amino radical containing from 1 to 12 carbon atoms inclusive, (iii) a group represented by the formula:

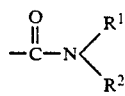

wherein $R^1$ and $R^2$ may be hydrogen, an alkyl radical containing from 1 to 12 carbon atoms inclusive, an aryl or aralkyl radical containing from 6 to 12 carbon atoms inclusive, or $R^1$ and $R^2$, taken together, are a divalent hydrocarbon radical which forms a heterocyclic ring with the nitrogen atom in said group, or are a group represented by the formula:

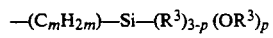

wherein m has a value of 2 to 6 inclusive, p has a value of from 1 to 3 inclusive, and $R^3$ is an alkyl radical containing from 1 to 12 carbon atoms inclusive, and (iv) a group represented by the formula:

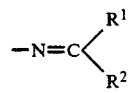

wherein $R^1$ and $R^2$ may be hydrogen, an alkyl radical containing from 1 to 12 carbon atoms inclusive, an aryl or aralkyl radical containing from 6 to 12 carbon atoms inclusive, or $R^1$ and $R^2$, taken together, are a divalent hydrocarbon radical which forms a heterocyclic ring with the nitrogen atom to which the divalent radical is attached; or (b) a group represented by the formula:

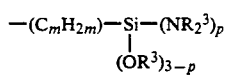

wherein m has a value of 2 to 6 inclusive, p has a value of from 1 to 3 inclusive, and $R^3$ is an alkyl radical containing from 1 to 12 carbon atoms inclusive;

(4) x is an integer having a value of from 0 to about 20,000;

(5) y is an integer having a value of from 1 to about 99; and (6) z is an integer having a value of from 1 to about 99.

3. The copolymer of claim 2 wherein Q represents the formula:

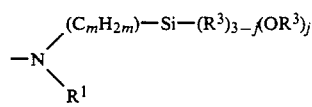

and T represents the formula:

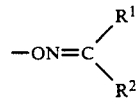

wherein:

(1) m equals 3 and j equals 3;

(2) $R^1$ and $R^2$ may be hydrogen, an alkyl radical containing from 1 to 12 carbon atoms inclusive, an alkoxy radical, an aryl or aralkyl radical containing from 6 to 12 carbon atoms inclusive, or $R^1$ and $R^2$, taken together, are a divalent hydrocarbon radical, and (3) $R^3$ is an alkyl radical containing from 1 to 12 carbon atoms inclusive.

4. The copolymer of claim 3 wherein:

(1) x is an integer having a value of from 5 to about 20; and (2) y is an integer having a value of from 1 to about 20; and (3) z is an integer having a value of from 1 to about 20.

5. The copolymer of claim 4 wherein R, $R^1$, and $R^2$ are alkyl groups of 1 to 6 carbon atoms inclusive.

6. A random organosiloxane copolymer of the formula:

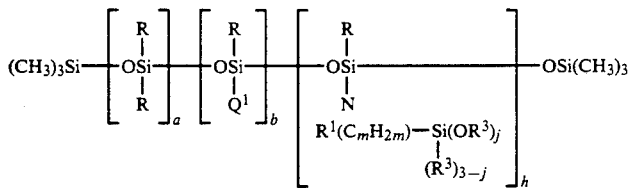

wherein:
(1) R represents an alkyl radical containing from 1 to 12 carbon atoms inclusive, a cycloalkyl radical containing from 6 to 12 carbon atoms inclusive, an aryl or aralkyl radical containing from 6 to 12 carbon atoms inclusive, and wherein R may be the same or different,
(2) $R^1$ may be hydrogen, an alkyl radical containing from 1 to 12 carbon atoms inclusive, an alkoxy radical, or an aryl or aralkyl radical containing from 6 to 12 carbon atoms inclusive;
(3) $R^3$ is an alkyl radical containing from 1 to 12 carbon atoms inclusive;
(4) $Q^1$ represents an amino group

wherein $R^6$ and $R^7$ may be hydrogen, an alkyl radical containing from 1 to 12 carbon atoms inclusive, an alkoxy radical, an aryl or aralkyl radical containing from 6 to 12 carbon atoms inclusive, or $R^6$ and $R^7$, taken together, are a divalent hydrocarbon radical which forms a heterocyclic ring with the nitrogen atom of said amino group;
(5) m is an integer having a value of from 2 to about 6;
(6) j is an integer having a value of 1 to 3;
(7) a is an integer having a value of from 0 to about 20,000;
(8) b is an integer having a value of from 1 to about 99; and
(9) h is an integer having a value of from 1 to about 99.

7. The copolymer of claim 6 wherein:
(1) $Q^1$ represents a morpholine radical, and
(2) $R^3$ represents an alkyl radical of 1 to 6 carbon atoms inclusive.

8. A random organosiloxane copolymer of claim 6 wherein:
(1) $Q^1$ represents a morpholine radical;
(2) each R represents a methyl group;
(3) $R^1$ represents a hydrogen atom;
(4) each $R^3$ represents an ethyl group;
(5) m has a value of 3;
(6) j has a value of 3;

(7) a has a value of from about 5 to about 100;
(8) b has a value of from 1 to about 20; and
(9) h has a value of from 1 to about 20.

9. A random organosiloxane copolymer of the formula:

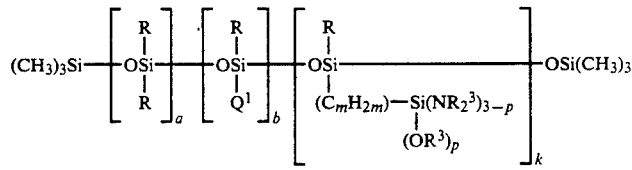

wherein:
(1) R represents an alkyl radical containing from 1 to 12 carbon atoms inclusive, a cycloalkyl radical containing from 6 to 12 carbon atoms inclusive, an aryl or aralkyl radical containing from 6 to 12 carbon atoms inclusive, and wherein R may be the same or different,
(2) $R^3$ is an alkyl radical containing from 1 to 12 carbon atoms inclusive;
(3) $Q^1$ is an amino group represented by the formula:

wherein $R^6$ and $R^7$ may be hydrogen, an alkyl radical containing from 1 to 12 carbon atoms inclusive, an alkoxy radical, an aryl or aralkyl radical containing from 6 to 12 carbon atoms inclusive, or $R^6$ and $R^7$, taken together, are a divalent hydrocarbon radical which forms a heterocyclic ring with the nitrogen atom of said amino group;
(4) m is an integer having a value of 3;
(5) p is an integer having a value of from 1 to 3;
(6) a is an integer having a value of from 0 to about 20,000;
(7) b is an integer having a value of from 1 to about 99;
(8) h is an integer having a value of from 1 to about 99.

10. The copolymer of claim 9, wherein:
(1) $R^3$, $R^6$, and $R^7$ each represent alkyl groups of 1 to 6 carbon atoms inclusive;
(2) m has a value of 2;
(3) p has a value of 3;
(4) a is an integer having a value of from about 5 to about 100;
(5) b is an integer having a value of from 1 to about 20;
(6) k is an integer having a value of from 1 to about 20.

11. A composition comprising a major portion of a silanol fluid and a minor portion of the composition of claim 1.

12. A composition comprising a major portion of a silanol fluid and a minor portion of the composition of claim 6.

13. A composition comprising a major portion of a silanol fluid and a minor portion of the composition of claim 8.

14. A composition comprising a major portion of a silanol fluid and a minor portion of the composition of claim 9.

15. A composition comprising a major portion of a silanol fluid and a minor portion of the composition of claim 2.

* * * * *